(12) United States Patent
Yoo et al.

(10) Patent No.: US 7,529,039 B2
(45) Date of Patent: May 5, 2009

(54) OBJECT LENS DEVICE WITH HIGH NUMERICAL APERTURE AND OPTICAL PICKUP DEVICE ADOPTING THE SAME

(75) Inventors: Jang-hoon Yoo, Seoul (KR); Dong-ho Shin, Yongin-si (KR); Soo-han Park, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 11/748,753

(22) Filed: May 15, 2007

(65) Prior Publication Data

US 2008/0074757 A1    Mar. 27, 2008

(30) Foreign Application Priority Data

Sep. 27, 2006    (KR) ...................... 10-2006-0094338

(51) Int. Cl.
*G02B 13/18* (2006.01)
*G02B 3/02* (2006.01)
*G02B 3/08* (2006.01)
*G11B 7/00* (2006.01)
*G11B 7/135* (2006.01)

(52) U.S. Cl. .................. 359/719; 359/742; 369/112.03
(58) Field of Classification Search ................. 359/719, 359/718, 724, 742, 743; 369/44.23, 112.03–112.05
See application file for complete search history.

(56) References Cited

U.S. PATENT DOCUMENTS

| 2002/0012313 | A1 | 1/2002 | Kimura et al. |
| 2002/0097504 | A1 | 7/2002 | Kitamura et al. |
| 2003/0035225 | A1 | 2/2003 | Kim et al. |
| 2003/0174416 | A1* | 9/2003 | Takahashi et al. ........... 359/719 |
| 2004/0080831 | A1 | 4/2004 | Kimura |
| 2004/0114245 | A1 | 6/2004 | Takahashi et al. |
| 2005/0063283 | A1 | 3/2005 | Ori et al. |

FOREIGN PATENT DOCUMENTS

| EP | 1 202 259 A | 5/2002 |
| JP | 2002-236253 | 8/2002 |

OTHER PUBLICATIONS

Search Report issued on Jan. 25, 2008 by the European Patent Office for European Patent Application No. 07105137.9.

* cited by examiner

*Primary Examiner*—Alicia M Harrington
(74) *Attorney, Agent, or Firm*—Stein, McEwen & Bui, LLP

(57) ABSTRACT

An object lens arranged on a light proceeding path to focus light on a recording medium includes a first surface that is an incident surface on which light is incident, a second surface from which light exits to be focused on the recording medium, and a diffractive optical element disposed on at least one of the first and second surfaces and which has a refractivity of $f_D/f<5$, $f_D$ being a focus distance of the diffractive optical element and f being a focal distance of the object lens. The object lens has a numerical aperture of 0.75 or greater.

28 Claims, 3 Drawing Sheets

OBJECT LENS DEVICE WITH HIGH NUMERICAL APERTURE AND OPTICAL PICKUP DEVICE ADOPTING THE SAME

CROSS-REFERENCE TO RELATED APPLICATION

This application claims the benefit of Korean Application No. 2006-94338, filed Sep. 27, 2006, in the Korean Intellectual Property Office, the disclosure of which is incorporated herein by reference.

BACKGROUND OF THE INVENTION

1. Field of the Invention

Aspects of the present invention relate to an object lens with a high numerical aperture that can be realized at a low cost and an optical pickup device adopting the same.

2. Description of the Related Art

In an optical recording and/or reproducing apparatus which records and/or reproduces information to and/or from an optical disc, which is a type of optical information storage medium that uses light focused by an object lens, the recording capacity of the optical information storage medium is determined by the size of a light spot. The size of a light spot S is determined by the wavelength λ of the light used and the numerical aperture (NA) of an object lens as shown in Equation 1.

$$S = \frac{2}{\pi} \cdot \frac{\lambda}{NA} \qquad \text{Equation (1)}$$

Thus, to reduce the size of a light spot formed on an optical disc for high density recording and/or reproducing to and/or from the optical disc, the use of a short wavelength light source and a high NA object lens are necessary.

A digital versatile disk (DVD) uses light having a wavelength of 650 nm (or 635 nm) and an object lens having an NA of 0.6 (0.65 for a recordable type), as is well known. When the diameter and track pitch of the disk are respectively 120 mm and 0.74 μm, the DVD has a recording capacity of about 4.7 GB or more for a single side. Thus, the DVD is insufficient as a recording medium for recording high definition (HD) level moving picture information. When moving picture information of 135 minutes is recorded in an HD level, a recording capacity of, for example, 23 GB or more for a single side is needed.

To meet the above demand for a high density recording capacity, there is a demand for a high density optical disc (that is, a next generation DVD (hereinafter, referred to as the HD-DVD (high definition-DVD))), which has a narrower track than a DVD and uses a blue light having a wavelength in the range of about 405 nm through 408 nm and an object lens having an NA of 0.6 or more. Also, companies are widely developing the Blu-ray disk (BD) as a next generation high density optical information recording storage medium which uses an object lens having a high NA, such as 0.85. The BD uses a blue light of a short wavelength (in the range of about 405 nm through 408 nm) as a light source, and has a recording capacity of about 20 GB or more.

Figure 1:
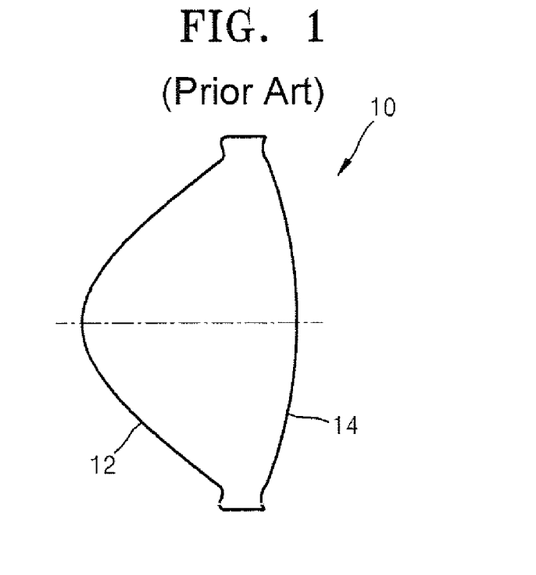
FIG. 1 is a view of a conventional object lens 10.

FIG. 1 shows the structure of a conventional object lens. Referring to FIG. 1, a conventional object lens 10 includes a first surface 12 that is a light incident surface and a second surface 14 that is a light exit surface. The first surface 12 is a spherical or aspherical surface having a large curvature. The second surface 14 is a flat surface or has a relatively small curvature. As a material of the object lens 10, a plastic material is preferred to a glass material in view of factors to be considered for mass production, including yield, processing ability, and life span. However, since the refractivity of plastic is generally lower than that of glass, it is difficult to manufacture the object lens 10 with a high NA in the form of a single unit lens by using plastic.

Specifically, it is difficult to manufacture the object lens 10 having a high NA and using plastic while satisfying an allowance condition of optical aberration due to the following manufacturing limitation. For the object lens 10 to have a short focal distance and a high NA, the lens surfaces 12 and 14 need to have a large curvature so that an inclination angle of the first surface 12 increases. When the inclination angle exceeds an allowance limit, the manufacturing of a mold becomes difficult, and accordingly, a production yield is lowered. Thus, an object lens having a high NA which can be easily manufactured and falls within an assembly allowance is necessary.

In addition, for an object lens used in an optical pickup apparatus which functions with a Blu-ray disk, since a laser diode of a blue wavelength is sensitive to a wavelength change according to the change in temperature, an object lens capable of correcting chromatism according to the wavelength change is necessary.

SUMMARY OF THE INVENTION

To solve the above and/or other problems, aspects of the present invention provide an object lens having a high NA and a small inclination angle of a lens surface by having a diffractive optical element disposed on the lens surface so that mass production is possible.

An aspect of the present invention provides an optical pickup device capable of recording and/or reproducing information onto and/or from a high density recording medium by adopting the above described object lens.

Additional aspects and/or advantages of the invention will be set forth in part in the description which follows and, in part, will be obvious from the description, or may be learned by practice of the invention.

According to an aspect of the present invention, an object lens arranged on a light proceeding path to focus light emitted from a light source on a recording medium includes a first surface that is an incident surface on which the light is incident, a second surface from which the light exits to be focused on the recording medium, and a diffractive optical element disposed on at least one of the first and second surfaces and satisfying a refractivity of $f_D/f<5$, $f_D$ being a focus distance of the diffractive optical element and f being a focal distance of the object lens, wherein the object lens has a numerical aperture of 0.75 or greater.

According to another aspect of the present invention, an optical pickup device to record and/or reproduce information to and/or from a recording medium includes a light source to emit light, an optical path changing member arranged between the light source and the recording medium to change a proceeding path of the light, an object lens arranged between the optical path changing member and the recording medium to focus the emitted light onto the recording medium, the object lens including a first surface that is an incident surface on which the light is incident, a second surface from which the light exits to be focused on the recording medium, a diffractive optical device disposed on at least one of the first and second surfaces and having a refractivity satisfying $f_D/f<5$, and having a high numerical aperture of 0.75 or more, $f_D$ being a focal distance of the diffract optical element and f being a focal distance of an overall object lens, and a photodetector to receive the light that is reflected by the recording medium which passes through the object lens and the optical path changing member, and to detect an information signal and an error signal from the received light.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Reference will now be made in detail to the present embodiments of the present invention, examples of which are illustrated in the accompanying drawings, wherein like reference numerals refer to the like elements throughout. The embodiments are described below in order to explain the present invention by referring to the figures. In the drawings the thickness of layers are exaggerated for clarity.

Figure 2:
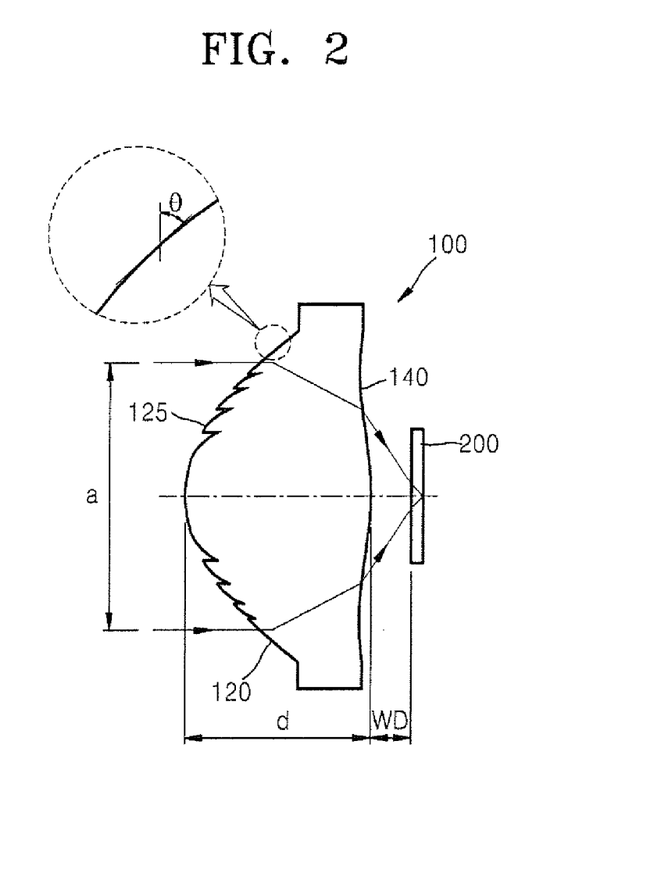
FIG. 2 is a view of an object lens 100 according to an embodiment of the present invention.

FIG. 2 is a view of an object lens 100 according to an embodiment of the present invention. Referring to FIG. 2, an object lens 100 includes a first surface 120 that is an incident surface on which light is incident, and a second surface 140 from which light focused toward a recording medium 200 is output. A diffractive optical element (DOE) is disposed on at least one of the first and second lens surfaces 120 and 140. For the shown example, a diffractive optical element 125 is disposed on the first surface 120 that is an incident surface. It is understood that the DOE may be disposed on the object lens in various ways. For example, the DOE may be permanently fixed to the object lens 100. Alternatively, the DOE may be detachably attached to the object lens 100 so that the DOE may be easily removed and/or replaced.

The reference numerals "a", "d", and "WD" respectively denote an effective diameter, a central thickness, and a working distance. While not required in all aspects, the object lens 100 preferably has a working distance WD which is as short as possible for miniaturization purposes, and also has a WD less than the central thickness D. It is understood, however, that a wide range of working distances may be used with embodiments of the present invention, and that the WD is not required to be less than the central thickness D.

A polymer material is preferably used for the object lens 100 in view of factors to be considered for mass production, including yield, processing ability, and life span. This polymer material is one type of plastic, however, it may be other types of polymers as well. Furthermore, it is understood that the object lens 100 is not required to be made out of a polymer material. Also, the effective diameter "a" that is a diameter of an entrance pupil through which light passes is preferably less than or equal to 1.5 times the central thickness "D". The first and second surfaces 120 and 140 can be aspherical surfaces, where the aspherical surface equation is as follows.

$$z(h) = \frac{\frac{h^2}{R}}{1 + \sqrt{1 - (1+K)\frac{h^2}{R}}} + Ah^2 + Bh^6 + Ch^8 + Dh^{10} + Eh^{12} + Fh^{14} + \ldots \quad \text{(Equation 2)}$$

Figure 3:
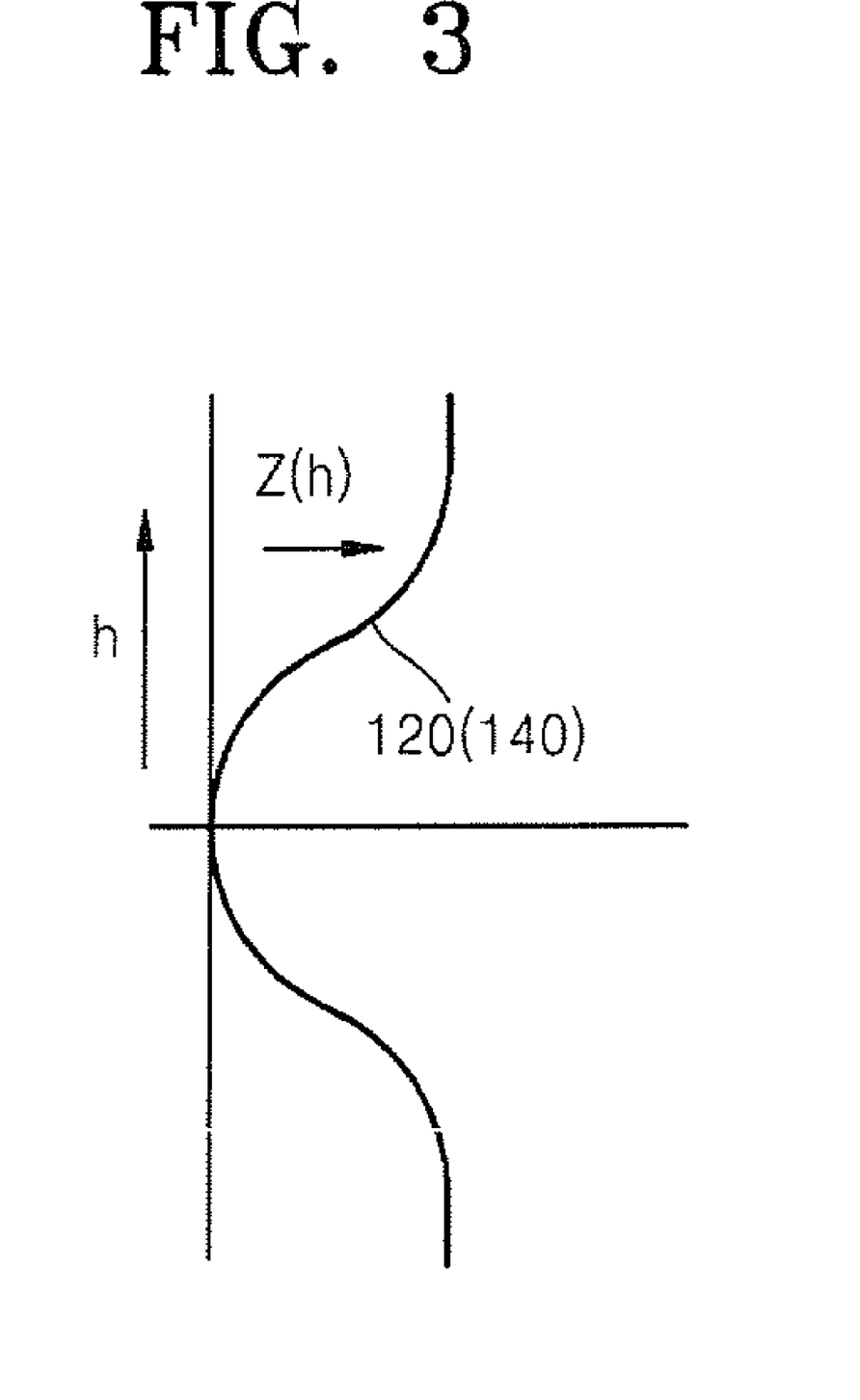
FIG. 3 is a view showing a method for representing an aspherical surface.

In Equation 2, "h" is a height from an optical axis, "z" is a depth from an apex of a surface as shown in FIG. 3, "R" is a radius curvature, "K" is a conic constant, and "A, B, C, D, E, F . . ." are aspherical coefficients.

The diffractive optical element 125 decreases the inclination angle of the first lens surface 120 and corrects chromatism. The detailed form of the diffractive optical element 125 is defined by the following equation which indicates an optical path difference by a diffraction structure.

$$\Phi(h) = \Sigma C_n h^{2n} = C_1 h^2 + C_2 h^4 + C_3 h^6 + \quad \text{(Equation 3)}$$

In Equation 3, the coefficients and diffraction orders of the optical path function can be appropriately selected. The minimum pitch of the diffractive optical element 125 is preferably 2 μm or less. It is understood, however, that the minimum pitch may be larger than 2 μm.

The principle which the diffractive optical element 125 uses to correct the chromatism is described below. For an object lens 10 which does not have the diffractive optical element 125 formed thereon, as the wavelength of the light incident on the object lens 10 gets shorter, the refraction angle increases. Thus, the light passing through the object lens 10 is focused closer to the object lens 10 as the wavelength of the light gets shorter. Meanwhile, for the light incident on the diffractive optical element 125, as the wavelength increases, the diffractive angle increases. Thus, the light having a longer wavelength is focused closer to the diffractive optical element 125. Since the chromatism characteristic according to the wavelength is reversed between the object lens 100 with the diffractive optical element 125 and the object lens 10 without the diffractive optical element 125, when the diffractive optical element 125 is disposed on a surface 120, 140 of the object lens 100, the chromatism is offset and reduced.

Table 1 shows data generated from a first design of the object lens 100 according to the present embodiment, and Table 2 shows the inclined angle of the first surface 120 calculated from the first design data. The inclined angle signifies an angle θ made by the first surface 120 and a surface perpendicular to the optical axis.

TABLE 1

| Surface | Radius curvature | Thickness | Material |
|---|---|---|---|
| Object surface | ∞ | ∞ | |
| First surface 120 | 1.50588 | D = 2.1 | n = 1.524037 |
| | K: −0.594402 | | |
| | A: 0.201658E−01 B: 0.308932E−02 | | |
| | C: 0.541844E−02 D: −.566968E−02 | | |
| | E: 0.182870E−02 F: 0.369368E−02 | | |
| | G: −.432136E−02 H: 0.183528E−02 | | |
| | J: −.290991E−03 | | |
| | DOE $C_1$: −4.0000E−02 Diffraction order: 2 | | |
| Second surface 140 | −2.68405 | WD = 0.476 | |
| | K: −77.786543 | | |
| | A: 0.157763E+00 B: −.320055E+00 | | |
| | C: 0.370457E+00 D: −.322595E+00 | | |
| | E: 0.167692E+00 F: −.367441E−01 | | |
| Disk surface | ∞ | 0.0875 | n = 1.621210 |
| Recording surface | ∞ | 0 | |
| Effective diameter (mm) | 3 | f (mm) | 1.765 |
| NA | 0.85 | $f_D$ (mm) | 6.25 |
| Chromatism (μm/nm) | 0.4 | $f_D/f$ | 3.54 |

TABLE 2

| Light ray height (h) | Aspherical surface SAG (z) | Angle (degree, minute, second) |
|---|---|---|
| 0.000000 | 0.000000 | 0 0 0 |
| 0.061000 | 0.001511 | 2 50 11 |

TABLE 2-continued

| Light ray height (h) | Aspherical surface SAG (z) | Angle (degree, minute, second) |
|---|---|---|
| 0.122000 | 0.006049 | 5 40 18 |
| 0.183000 | 0.013636 | 8 30 13 |
| ... | | |
| 1.098000 | 0.558408 | 49 37 21 |
| 1.403000 | 1.017861 | 62 2 21 |
| 1.464000 | 1.136538 | 63 19 14 |
| 1.525000 | 1.256518 | 62 3 15 |

Table 3 shows data generated from a second design of the object lens 100 according to the present embodiment and Table 4 shows the inclined angle of the first surface 120 calculated from the second design data.

TABLE 3

| Surface | Radius curvature | Thickness | Material |
|---|---|---|---|
| Object surface | ∞ | ∞ | |
| First surface 120 | 1.42398 | D = 2.1 | n = 1.524037 |
| | K: −0.613626 | | |
| | A: 0.168879E−01 B: 0.296671E−02 C: 0.514082E−02 | | |
| | D: −.638958E−02 E: 0.214154E−02 F: 0.384683E−02 | | |
| | G: −.439901E−02 H: 0.177746E−02 J: −.261805E−03 | | |
| | DOE $C_1$: −2.7000E−02 Diffraction order: 2 | | |
| Second surface 140 | −2.76020 | WD = 0.582048 | |
| | K: −54.159462 | | |
| | A: 0.149905E+00 B: −.312869E+00 C: 0.415648E+00 | | |
| | D: −.327140E+00 E: 0.114403E+00 F: −.830868E−02 | | |
| Disk surface | ∞ | 0.0875 | n = 1.621210 |
| Recording surface | ∞ | 0 | |
| Effective diameter (mm) | 3 | f (mm) | 1.848 |
| NA | 0.85 | $f_D$ (mm) | 9.26 |
| Chromatism (μm/nm) | 0.3 | $f_D/f$ | 5.0 |

TABLE 4

| Light ray height (h) | Aspherical surface SAG (z) | Angle (degree, minute, second) |
|---|---|---|
| 0.000000 | 0.000000 | 0 0 0 |
| 0.061000 | 0.001307 | 2 27 16 |
| 0.122000 | 0.005234 | 4 54 38 |
| 1.403000 | 0.881951 | 58 33 35 |
| 1.464000 | 0.985883 | 60 27 42 |
| 1.525000 | 1.095182 | 60 45 56 |

Table 5 shows data generated from a third design of the object lens 100 according to the present embodiment and Table 6 shows the inclined angle of the first surface 120 calculated from the third design data.

TABLE 5

| Surface | Radius curvature | Thickness | Material |
|---|---|---|---|
| Object surface | ∞ | ∞ | |
| First surface 120 | 1.36777 | D = 2.2 | n = 1.524037 |
| | K: −0.613626 | | |
| | A: 0.188225E−01 B: 0.231601E−02 C: 0.637960E−02 | | |
| | D: −.634742E−02 E: 0.195236E−02 F: 0.385430E−02 | | |
| | G: −.434228E−02 H: 0.179845E−02 J: −.278102E−03 | | |
| | DOE $C_1$: −2.7000E−02 Diffraction order: 2 | | |
| Second surface 140 | −1.93867 | WD = 0.456855 | |
| | K: −51.863458 | | |
| | A: 0.175692E+00 B: −.320377E+00 C: 0.363445E+00 | | |
| | D: −.306373E+00 E: 0.149953E+00 F: −.285943E−01 | | |
| Disk surface | ∞ | 0.0875 | n = 1.621210 |

TABLE 5-continued

| Surface | Radius curvature | Thickness | Material |
|---|---|---|---|
| Recording surface | ∞ | 0 | |
| Effective diameter (mm) | 3 | f (mm) | 1.755 |
| NA | 0.85 | $f_D$ (mm) | 9.26 |
| Chromatism (μm/nm) | 0.2 | $f_D/f$ | 5.27 |

TABLE 6

| Light ray height (h) | Aspherical surface SAG (z) | Angle (degree, minute, second) |
|---|---|---|
| 0.000000 | 0.000000 | 0 0 0 |
| 0.061000 | 0.001361 | 2 33 20 |
| ... | | |
| 1.403000 | 0.950131 | 61 28 46 |
| 1.464000 | 1.067096 | 63 13 23 |
| 1.525000 | 1.188500 | 62 50 10 |

Table 7 shows data generated from a fourth design of the object lens 100 according to the present embodiment and Table 8 shows the inclined angle of the first surface 120 calculated from the fourth design data.

TABLE 7

| Surface | Radius curvature | Thickness | Material |
|---|---|---|---|
| Object surface | ∞ | ∞ | |
| First surface 120 | 1.36777 | D = 1.701 | n = 1.524037 |
| | K: −0.621883 | | |
| | A: 0.355344E−01 B: 0.809609E−02 | | |
| | C: 0.203121E−01 D: −.391596E−01 | | |
| | E: 0.188977E−01 F: 0.571164E−01 | | |
| | G: −.102500E+00 H: 0.655183E−01 | | |
| | J: −.159189E−01 | | |
| | DOE $C_1$: −4.938E−02 Diffraction order: 2 | | |
| Second surface 140 | −1.93867 | WD = 0.343 | |
| | K: −51.863458 | | |
| | A: 0.175692E+00 B: −.320377E+00 | | |
| | C: 0.363445E+00 D: −.306373E+00 | | |
| | E: 0.149953E+00 F: −.285943E−01 | | |
| Disk surface | ∞ | 0.0875 | N = 1.621210 |
| Recording surface | ∞ | 0 | |
| Effective diameter (mm) | 3 | f (mm) | 1.4286 |
| NA | 0.81 | $f_D$ (mm) | 5.06 |
| Chromatism (μm/nm) | 0.58 | $f_D/f$ | 3.2 |

TABLE 8

| Light ray height (h) | Aspherical surface SAG (z) | Angle (degree, minute, second) |
|---|---|---|
| 0.000000 | 0.000000 | 0 0 0 |
| 0.047000 | 0.000886 | 2 9 33 |
| ... | | |
| 1.081000 | 0.573766 | 51 35 3 |
| 1.128000 | 0.634023 | 52 16 44 |
| 1.175000 | 0.693684 | 50 38 10 |

Table 9 shows data generated from a fifth design of the object lens 100 according to the present embodiment and Table 10 shows the inclined angle of the first surface 120 calculated from the fifth design data.

TABLE 9

| Surface | Radius curvature | Thickness | Material |
|---|---|---|---|
| Object surface | ∞ | ∞ | |
| First surface 120 | 1.78756 | D = 2.1500 | n = 1.524037 |
| | K: −0.600214 | | |
| | A: 0.203789E-01 B: 0.319915E-02 | | |
| | C: 0.600509E-02 D: −.720879E-02 | | |
| | E: 0.242878E-02 F: 0.397296E-02 | | |
| | G: −.443816E-02 H: 0.174151E-02 | | |
| | J: −.248781E-03 | | |
| | DOE $C_1$: −5.8814E-02 Diffraction order: 2 | | |
| Second surface 140 | −4.11230 | WD = 0.4 | |
| | K: −51.863458 | | |
| | A: 0.175692E+00 B: −.320377E+00 | | |
| | C: 0.363445E+00 D: −.306373E+00 | | |
| | E: 0.149953E+00 F: −.285943E-01 | | |
| Disk surface | ∞ | 0.0875 | N = 1.621210 |
| Recording surface | ∞ | 0 | |
| Effective diameter (mm) | 1.5 | f (mm) | 1.783 |
| NA | 0.84 | $f_D$ (mm) | 4.25 |
| Chromatism (μm/nm) | 1.0 | $f_D/f$ | 2.38 |

TABLE 10

| Light ray height (h) | Aspherical surface SAG (z) | Angle (degree, minute, second) |
|---|---|---|
| 0.000000 | 0.000000 | 0 0 0 |
| 0.060000 | 0.001007 | 1 55 25 |
| ... | | |
| 1.320000 | 0.613914 | 50 15 58 |
| 1.380000 | 0.689927 | 53 07 03 |
| 1.440000 | 0.773958 | 55 43 30 |
| 1.500000 | 0.865350 | 57 26 38 |

In each of the five designs used to generate the above data, a blue light having a 407.7 nm wavelength is used, and "$f_D/f$" is a value indicating the refractivity of the diffractive optical element 125. "f" is a focal distance of the overall object lens. "$f_D$" is an amount representing the focal distance of only the diffractive optical element, which is determined from the coefficients $C_1, C_2, C_3 \ldots$ of the optical path difference function expressed by Equation 3. Each of the five object lenses according to the above designs have an NA higher than 0.8. The diffraction order of the diffractive optical element 125 is set to the second order. "$F_D/f$" has a value in a range between about 2.38 through 5.27, and can be adjusted to have a value less than 5 by appropriately selecting a hologram constant $C_1$. Also, the chromatism of the five object lenses according to the five designs has a value of not more than 1.0 μm/nm, which means that the focus shift with respect to the wavelength change of 1 nm is not more than 1.0 um. The inclination angle of the lens surface has a maximum value of not more than 63°.

Figure 4:
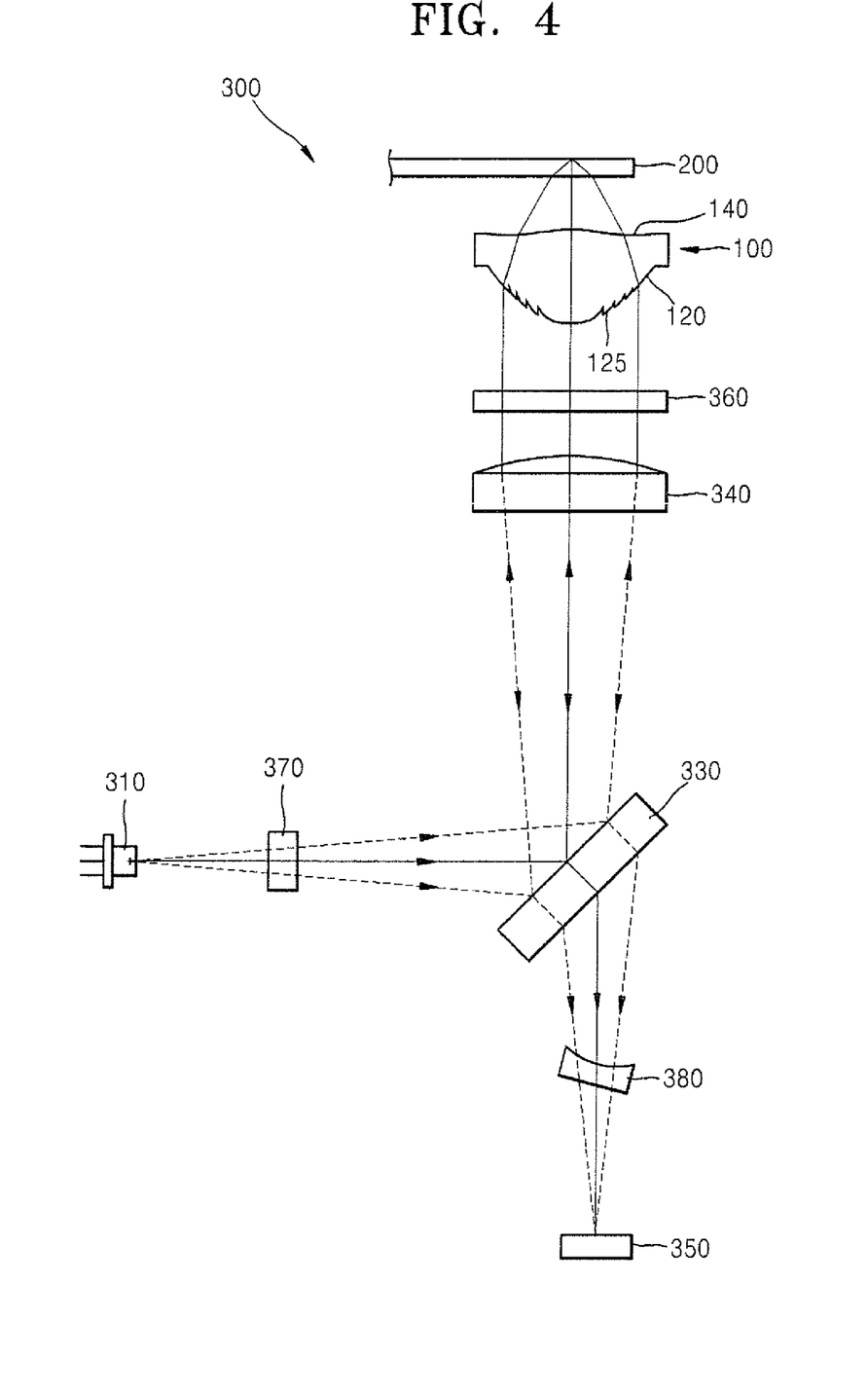
FIG. 4 is a view of an optical pickup device 300 according to an embodiment of the present invention.

FIG. 4 shows the structure of an optical pickup device according to an embodiment of the present invention. Referring to FIG. 4, an optical pickup device 300 is an apparatus to record and/or reproduce information to and/or from an optical recording medium 200 and includes a light source 310, an optical path changing member 330, the object lens 100, and a photodetector 350. A DVD, HD-DVD, or Blu-ray disc may be used as the recording medium 200. It is understood that other types of optical discs may also be used as the recording medium 200, such as CDs, etc.

The light source 310 generates and emits light having a predetermined wavelength and is preferably, but not necessarily, formed as a laser diode LD. When a Blu-ray disc is used as the recording medium 200, a blue light is used which has a wavelength of about 405 nm through 408 nm so that recording and/or reproduction of information to and/or from the Blu-ray disc is possible.

The optical path changing member 330 is arranged on an optical path between the light source 310 and the object lens 100 to change a proceeding path of incident light. The optical path changing member 330 may be various types of components, such as, for example, a polarizing beam splitter that reflects light of one polarization of the incident light and transmits light of the other polarization. The optical path changing member 330 reflects the light output from the light source 310 towards the recording medium 200, and then transmits the light reflected from the recording medium 200 towards the photodetector 350.

The object lens 100 is arranged between the light source 310 and the recording medium 200 and includes a first surface 120 that is an incident surface on which light is incident and a second surface 140 from which light exits to be focused on the recording medium 200. The diffractive optical element (DOE) 125 is disposed on at least one of the first and second lens surfaces 120 and 140. For the shown example, the diffractive optical element 125 may be formed on the first surface 120 that is an incident surface. The object lens 100 has the diffractive optical element 125 to correct chromatism and decrease the maximum inclination angle, and also has a high NA. The structure and operation of the object lens 100 are substantially the same as the above-described object lens 100 (FIG. 2) and those designs which generated the above design data.

The photodetector 350 receives the light after the light is reflected by the recording medium 200 and passes through the object lens 100 and the optical path changing member 330, in order to detect an information signal and an error signal from the received light. It is understood that the photodetector 350 is not limited to being configured as shown in FIG. 4, and may instead be disposed in other locations.

A collimating lens 340 is disposed on the optical path between the object lens 100 and the optical path changing member 330 to converge incident divergent light into a parallel beam. A quarter wave plate 360 is disposed on the optical path between the optical path changing member 330 and the object lens 100 to transmit light of a circular polarization to the recording medium 200. Also, a grating 370 is additionally disposed on the optical path between the light source 310 and the optical path changing member 330 to diffractively transmit the incident light. An astigmatism lens 380 capable of correcting coma aberration is disposed on the optical path between the optical path changing member 330 and the photodetector 350 in a direction opposite to a direction in which the optical path changing member 30 is inclined. It is understood that the configuration of the optical pickup device 300 shown in FIG. 4 may be altered in various ways and still function properly with the object lens 100. For instance, ones of the quarter wave plate 360, collimating lens 340, grating 370, and/or astigmatism lens 380 can be otherwise located, combined or removed.

As described above, since the object lens according to aspects of the present invention includes the diffractive optical element disposed on the lens surface, the object lens has a high NA and a low inclination angle, so that the object lens can be mass produced at low costs. Also, the optical pickup device according to aspects of the present invention uses the object lens having the above structure so that a high NA may be maintained and chromatism characteristics may be improved. The optical pickup device according to aspects of the present invention may in turn be used inside of various types of optical recording and/or reproducing apparatuses. Thus, information can be recorded and/or reproduced to and/or from various types of high density optical discs, such as a Blu-ray disc (BD) having a recording density of about 20 GB or more. While described in the context of a blue light, it is understood that aspects of the invention can be used with other wavelengths. Further, while described in terms of an apparatus to reproduce HD-DVD and/or Blu-ray discs, it is understood that the apparatus can be used with other media in addition to or instead of HD-DVD and Blu-ray discs.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. An object lens arranged on a light proceeding path to focus light emitted from a light source on a recording medium, the object lens comprising:
    a first surface that is an incident surface on which the light is incident;
    a second surface from which the light exits to be focused on the recording medium; and
    a diffractive optical element disposed on at least one of the first and second surfaces and satisfying a refractivity of $f_D/f<5$, $f_D$ being a focal distance of the diffractive optical element and f being a focal distance of the object lens, wherein the object lens has a numerical aperture of 0.75 or greater.

2. The object lens of claim 1, wherein the diffractive optical element is disposed on the first surface.

3. The object lens of claim 1, wherein an inclination angle between the first surface and a surface perpendicular to an optical axis, and an inclination angle between the second surface and the surface perpendicular to the optical axis, are 63° or less.

4. The object lens of claim 1, wherein chromatism is 1 µm/nm or less, so that a focal point of the light shifts no more than 1 µm when a wavelength of the light shifts 1 nm.

5. The object lens of claim 1, wherein a diffraction order of the diffractive optical element is 2.

6. The object lens of claim 1, wherein a minimum pitch of the diffractive optical element is 2 µm or greater.

7. The object lens of claim 1, wherein an effective diameter of the object lens through which the light passes is no more than 1.5 times a central thickness of the object lens.

8. The object lens of claim 1, wherein the object lens is formed of a polymer material.

9. The object lens of claim 1, wherein the object lens is formed of plastic.

10. The object lens of claim 1, wherein the light emitted from the light source is within a range of about 405 nm through 408 nm.

11. The object lens of claim 1, wherein the recording medium has a recording capacity of at least 20 GB.

12. The object lens of claim 1, wherein the recording medium is one of a Blu-ray disk (BD) or a High-Definition DVD (HD-DVD).

13. The object lens of claim 1, wherein at least one of the first and second surfaces comprises an aspherical surface defined by the equation:

$$z(h) = \frac{\frac{h^2}{R}}{1+\sqrt{1-(1+K)\frac{h^2}{R}}} + Ah^2 + Bh^6 + Ch^8 + Dh^{10} + Eh^{12} + Fh^{14} + \ldots$$

with h being a height from an optical axis, z being a depth from an apex, R being a radius curvature, K being a conic constant, and A, B, C, D, E, F . . . being aspherical constants.

14. The object lens of claim 1, wherein the diffractive optical element has an optical path difference defined by the equation:

$$\Phi(h)=\Sigma C_n h^{2n}+C_1 h^2+C_2 h^4+C_3 h^6+\ldots$$

with n being an integer, $C_n$ being a diffraction coefficient, and h being a height from an optical axis.

15. An optical pickup device to record and/or reproduce information to and/or from a recording medium, the optical pickup device comprising:
    a light source to emit light;
    an optical path changing member arranged between the light source and the recording medium which changes a proceeding path of the light;
    an object lens arranged between the optical path changing member and the recording medium to focus the emitted light onto the recording medium, the object lens comprising:
        a first surface that is an incident surface on which the light is incident,
        a second surface from which the light exits to be focused on the recording medium, and
        a diffractive optical element disposed on at least one of the first and second surfaces and having a refractivity satisfying $f_D/f<5$ and a numerical aperture of 0.75 or greater, $f_D$ being a focal distance of the diffractive optical element and f being a focal distance of the object lens; and
    a photodetector to receive the light after the light is reflected by the recording medium and passes through the object lens and the optical path changing member, and to detect an information signal and an error signal from the received light.

16. The optical pickup device of claim 15, wherein the light source emits a blue light having a wavelength in a range of about 405 nm through 408 nm.

17. The optical pickup device of claim 15, wherein the diffractive optical element of the object lens is disposed on the first surface.

18. The optical pickup device of claim 15, wherein an inclination angle between the first surface and a surface perpendicular to an optical axis, and an inclination angle between the second surface and the surface perpendicular to the optical axis, are 63° or less.

19. The optical pickup device of claim 15, wherein chromatism of the object lens is 1 µm/nm or less, so that a focal point shifts no more than 1 µm when a wavelength of the light shifts 1 nm.

20. The optical pickup device of claim 15, wherein a diffraction order of the diffractive optical element of the object lens is 2.

21. The optical pickup device of claim 15, wherein a minimum pitch of the diffractive optical element is 2 µm or greater.

22. The optical pickup device of claim 15, wherein an effective diameter of the object lens through which light passes is no more than 1.5 times a central thickness of the object lens.

23. The optical pickup device of claim 15, wherein the object lens is formed of a polymer material.

24. The optical pickup device of claim 15, wherein the object lens is formed of plastic.

25. The optical pickup device of claim 15, wherein the recording medium has a recording capacity of at least 20 GB.

26. The optical pickup device of claim 15, wherein the recording medium is one of a Blu-ray disk (BD) or a High-Definition DVD (HD-DVD).

27. The object lens of claim 15, wherein at least one of the first and second surfaces comprises an aspherical surface defined by the equation:

$$z(h) = \frac{\frac{h^2}{R}}{1 + \sqrt{1 - (1+K)\frac{h^2}{R}}} + Ah^2 + Bh^6 + Ch^8 + Dh^{10} + Eh^{12} + Fh^{14} + \ldots$$

with h being a height from an optical axis, z being a depth from an apex, R being a radius curvature, K being a conic constant, and A, B, C, D, E, F . . . being aspherical constants.

28. The object lens of claim 15, wherein the diffractive optical element has an optical path difference defined by the equation:

$$\Phi(h) = \Sigma C_n h^{2n} + C_1 h^2 + C_2 h^4 + C_3 h^6 + \ldots$$

with n being an integer, $C_n$ being a diffraction coefficient, and h being a height from an optical axis.

* * * * *

UNITED STATES PATENT AND TRADEMARK OFFICE
CERTIFICATE OF CORRECTION

PATENT NO. : 7,529,039 B2
APPLICATION NO. : 11/748753
DATED : May 5, 2009
INVENTOR(S) : Jang-hoon Yoo et al.

It is certified that error appears in the above-identified patent and that said Letters Patent is hereby corrected as shown below:

Column 4, line 9, change

"$\Phi(h) = \sum C_n h^{2n} = C_1 h^2 + C_2 h^4 + C_3 h^6 +$" to

--$\Phi(h) = \sum C_n h^{2n} = C_1 h^2 + C_2 h^4 + C_3 h^6 +...$--.

Column 10, line 9, change

"$\Phi(h) = \sum C_n h^{2n} + C_1 h^2 + C_2 h^4 + C_3 h^6 +...$" to

--$\Phi(h) = \sum C_n h^{2n} = C_1 h^2 + C_2 h^4 + C_3 h^6 +...$--.

Column 12, line 9, change

"$\Phi(h) = \sum C_n h^{2n} + C_1 h^2 + C_2 h^4 + C_3 h^6 +$" to

--$\Phi(h) = \sum C_n h^{2n} = C_1 h^2 + C_2 h^4 + C_3 h^6 +...$--.

Signed and Sealed this

First Day of September, 2009

David J. Kappos
*Director of the United States Patent and Trademark Office*